(12) United States Patent
Adogla

(10) Patent No.: US 12,058,013 B2
(45) Date of Patent: Aug. 6, 2024

(54) TECHNIQUES FOR ALLOCATING CAPACITY IN CLOUD-COMPUTING ENVIRONMENTS

(71) Applicant: Oracle International Corporation, Redwood Shores, CA (US)

(72) Inventor: Eden Grail Adogla, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/176,313

(22) Filed: Feb. 28, 2023

(65) Prior Publication Data

US 2023/0216750 A1 Jul. 6, 2023

Related U.S. Application Data

(63) Continuation of application No. 17/005,035, filed on Aug. 27, 2020, now Pat. No. 11,665,068.

(51) Int. Cl.
*H04L 41/5051* (2022.01)
*G06F 9/50* (2006.01)
*H04L 67/10* (2022.01)

(52) U.S. Cl.
CPC ........ *H04L 41/5051* (2013.01); *G06F 9/5077* (2013.01); *H04L 67/10* (2013.01)

(58) Field of Classification Search
CPC .... H04L 41/5051; H04L 67/10; G06F 9/5077
See application file for complete search history.

(56) References Cited

U.S. PATENT DOCUMENTS

| 8,327,102 | B1 | 12/2012 | Palsule et al. |
| 10,684,801 | B1 | 6/2020 | Bhangria et al. |
| 10,877,796 | B1 | 12/2020 | Kinney, Jr. et al. |
| 2005/0172097 | A1* | 8/2005 | Voigt ............. G06F 3/067 711/170 |
| 2013/0031559 | A1* | 1/2013 | Alicherry ......... G06F 9/5077 718/104 |
| 2013/0262915 | A1* | 10/2013 | Frank ............. H04L 41/00 714/4.11 |

(Continued)

OTHER PUBLICATIONS

U.S. Appl. No. 17/005,035, Final Office Action, Mailed on Sep. 6, 2022, 15 pages.

(Continued)

*Primary Examiner* — Raqiul A Choudhury
(74) *Attorney, Agent, or Firm* — Kilpatrick Townsend & Stockton LLP

(57) ABSTRACT

Systems, devices, and methods discussed herein enable the provisioning of one or more virtual resources within a cloud-computing environment based at least in part on user-defined constraints. By way of example, a request to provision one or more virtual resources within the cloud-computing environment may be received. The request may include a set of user-defined constraints. Placement data indicating a mapping of a particular virtual resource to a particular hardware resource may be obtained based at least in part on the set of user-defined constraints. The virtual resource(s) may be provisioned within the cloud-computing environment in accordance with the set of user-defined constraints based at least in part on utilization of the placement data.

20 Claims, 11 Drawing Sheets

(56) References Cited

U.S. PATENT DOCUMENTS

| | | |
|---|---|---|
| 2013/0283263 A1 | 10/2013 | Elemary |
| 2013/0290511 A1 | 10/2013 | Tu et al. |
| 2015/0120920 A1 | 4/2015 | Ferris et al. |
| 2016/0330277 A1* | 11/2016 | Jain .................. H04L 67/1095 |
| 2017/0068557 A1 | 3/2017 | Cropper et al. |
| 2017/0220365 A1* | 8/2017 | Dow ................... G06F 9/5077 |

OTHER PUBLICATIONS

U.S. Appl. No. 17/005,035, First Action Interview Office Action Summary, Mailed on Jun. 7, 2022, 5 pages.
U.S. Appl. No. 17/005,035, First Action Interview Pilot Program Pre-Interview Communication, Mailed on Jan. 25, 2022, 17 pages.
U.S. Appl. No. 17/005,035, Notice of Allowance, Mailed on Jan. 12, 2023, 10 pages.

\* cited by examiner

TECHNIQUES FOR ALLOCATING CAPACITY IN CLOUD-COMPUTING ENVIRONMENTS

CROSS-REFERENCE TO RELATED APPLICATION

This application is a continuation of, and claims priority from, U.S. patent application Ser. No. 17/005,035, filed on Aug. 27, 2020, entitled "Techniques for Allocating Capacity in Cloud-Computing Environments," which is hereby expressly incorporated by reference in its entirety for all purposes.

BACKGROUND

Cloud-based platforms have become increasingly common. Cloud data centers are challenged to provide high performance and quality service. Such cloud-based platforms may offer entire suites of cloud solutions built around a customer's data. The placement of virtual machines among physical machines in the cloud (referred to as "provisioning") is significant in optimizing cloud performance. However, the particular manner in which resources of the cloud-computing environment are provisioned is traditionally determined by the cloud-computing provider. As a result, the manner in which the resources are provisioned may be suboptimal with respect to the user.

Embodiments of the instant disclosure address these and other problems, individually and collectively.

BRIEF SUMMARY

Techniques are provided (e.g., a method, a system, non-transitory computer-readable medium storing code or instructions executable by one or more processors) for provisioning resources of a cloud-computing environment to a user based at least in part on user-defined constraints. Various embodiments are described herein, including methods, systems, non-transitory computer-readable storage media storing programs, code, or instructions executable by one or more processors, and the like.

One embodiment is directed to a method for provisioning one or more virtual resources in accordance with user-defined constraints. The method may comprise receiving, by a computing service of a cloud-computing environment from a client device, a request to provision one or more virtual resources within the cloud-computing environment. In some embodiments, the cloud-computing environment comprises a plurality of hardware resources. The request may comprise a set of user-defined constraints for provisioning the one or more virtual resources within the cloud-computing environment. The method may further comprise obtaining, by the computing service, placement data indicating a mapping of a particular virtual resource of the one or more virtual resources to a particular hardware resource of the plurality of hardware resources. In some embodiments, the placement data is obtained based at least in part on the set of user-defined constraints. The method may further comprise provisioning, by the computing service, the one or more virtual resources based at least in part on the placement data. In some embodiments, the one or more virtual resources are provisioned in accordance with the set of user-defined constraints based at least in part on utilization of the placement data.

Another embodiment is directed to a computing device of a cloud computing environment, the computing device. The computing device may comprise a computer-readable medium storing non-transitory computer-executable program instructions. The computing device may further comprise a processing device communicatively coupled to the computer-readable medium for executing the non-transitory computer-executable program instructions. Executing the non-transitory computer-executable program instructions with the processing device causes the computing device to perform operations. The operations may comprise receiving, from a client device, a request to provision one or more virtual resources within the cloud-computing environment. In some embodiments, the cloud-computing environment comprises a plurality of hardware resources. The request may comprise a set of user-defined constraints for provisioning the one or more virtual resources within the cloud-computing environment. The operations may further comprise obtaining placement data indicating a mapping of a particular virtual resource of the one or more virtual resources to a particular hardware resource of the plurality of hardware resources. In some embodiments, the placement data is obtained based at least in part on the set of user-defined constraints. The operations may further comprise provisioning the one or more virtual resources based at least in part on the placement data. In some embodiments, the one or more virtual resources are provisioned in accordance with the set of user-defined constraints based at least in part on utilization of the placement data.

Yet another embodiment is directed to a non-transitory computer-readable storage medium storing computer-executable program instructions that, when executed by a processing device of a computing device, cause the computing device to perform operations. The operations may comprise receiving, from a client device, a request to provision one or more virtual resources within the cloud-computing environment. In some embodiments, the cloud-computing environment comprises a plurality of hardware resources. The request may comprise a set of user-defined constraints for provisioning the one or more virtual resources within the cloud-computing environment. The operations may further comprise obtaining placement data indicating a mapping of a particular virtual resource of the one or more virtual resources to a particular hardware resource of the plurality of hardware resources. In some embodiments, the placement data is obtained based at least in part on the set of user-defined constraints. The operations may further comprise provisioning the one or more virtual resources based at least in part on the placement data. In some embodiments, the one or more virtual resources are provisioned in accordance with the set of user-defined constraints based at least in part on utilization of the placement data.

The foregoing, together with other features and embodiments will become more apparent upon referring to the following specification, claims, and accompanying drawings.

DETAILED DESCRIPTION

Figure 1:
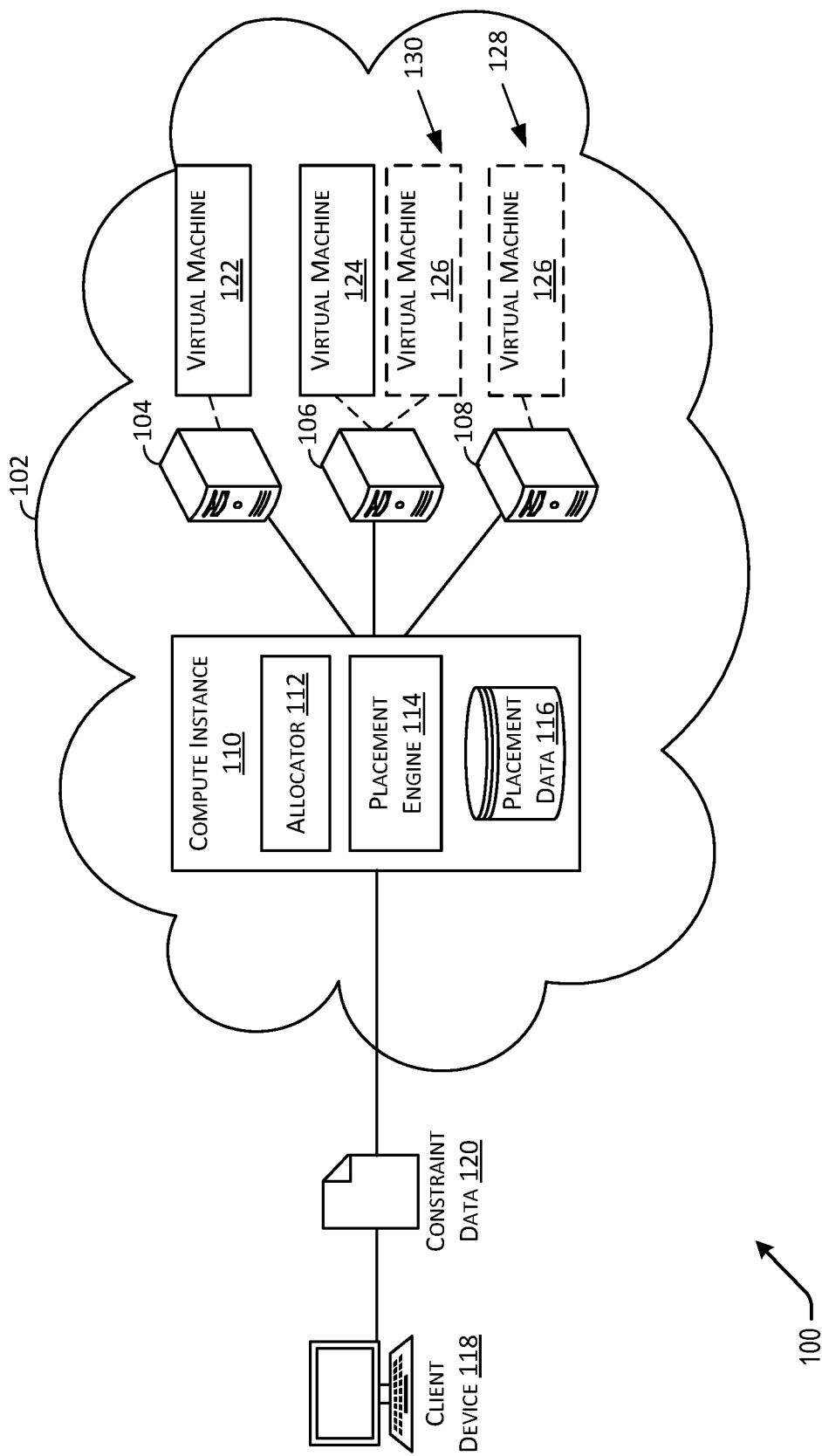
FIG. 1 depicts an illustrative system in which embodiments of the disclosure may be implemented, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to a system and techniques for allocating capacity in a cloud-computing environment. Conventionally, capacity allocation was performed by the cloud-computing provider using a bin-packing algorithm that seeks a best fit solution. A "bin-packing algorithm" seeks to find a solution (e.g., a bin-packing configuration) for a number of items (e.g., virtual machines) that must be packed in a finite number of resources (e.g., hardware resources having a fixed size) in a way that minimizes the resources utilized. A user that submits a request for resource provisioning may receive a suboptimal bin-packing configuration due to the fact that conventional algorithms do not take user-defined constraints into account when determining the bin-packing configuration. A "bin-packing configuration" may also be referred to as "placement data" in this disclosure and may include a mapping of virtual resources to physical devices. "User constraints," as used herein, may include any suitable combination a number of computing cores, an amount of memory, an amount of storage space, a chipset type, a cost, or a resource density, to name a few. In some embodiments, user constraints may include any suitable data by which placement of a set of one or more virtual machines is to be constrained. If a user is unhappy with the placement of his virtual resources, the user is required to discard the current solution and make a new request with the hope that the cloud-computing provider provisions the virtual resources in a more optimal manner with respect to the user's needs. As the user lacks the ability to control any part of the placement solution, the user could easily end up discarding the cloud-computing provider's solution a number of times before he is provided a placement with which he is satisfied. Thus, the current solutions may introduce delay in provisioning the user's virtual machines. Additionally, in conventional cloud-computing provisioning, a solution is not guaranteed. A user receives no indication that an actual solution even exists.

Embodiments discussed herein are directed to improving the provisioning techniques of a cloud-computing environment to enable user-defined constraints to be employed when determining placement of virtual machines within physical devices. In some embodiments, an allocator, by default, may execute a standard bin-packing algorithm when no user-defined constraints have been provided in a provisioning request. However, when a provisioning request is received that includes user-defined constraints, the allocator may be configured to execute the bin-packing algorithm using the received user-defined constraints as input such that the user-defined constraints are factored in when the bin-packing configuration is generated.

By way of illustration, a user may submit a provisioning request (for brevity, a "request"). The request may include user-defined constraints that indicate the physical devices used to place the user's virtual machines (VMs) are to utilize an Intel® chip rather than an Advanced Micro Devices (AMD) chip. As another example, the user-defined constraints may indicate that the hardware resources utilized for placement of the user's VMs should include four or more processing cores. In some embodiments, the system may receive user-defined constraints over time via any suitable number of provisioning requests. In some embodiments, the system may be configured to wait for an indication that all user-defined constraints have been communicated before determining a placement for the user's VMs. As another example, the system may receive a complete set of user-defined constraints in a single communication and proceed immediately to calculating placement data for the user's one or more VMs. In still further examples, the system may receive as part of the request placement data provided from the user. The placement data may specify particular VMs are to be placed with particular hardware resources (e.g., particular machines). Thus, in some embodiments, the user may utilize any suitable method to generate the placement data according to any suitable user-defined constraints and then provide the placement data to the system to cause the VMs to be placed in accordance with the user-defined placement data.

Embodiments described herein may provide several advantages over conventional systems. For example, embodiments may enable the user to fully control the placement of their VMs in a cloud-computing environment. In some embodiments, the user may provide one or more constraints with which the system will determine one or more placement solutions, or the user may provide a specific placement solution (e.g., placement data) to the system and the VMs may be placed according to that placement solution. Utilizing the techniques described herein, the user is able to obtain an optimal placement faster than previous systems allowed as the user can inject various parameters with which placement decisions are made.

FIG. 1 depicts an illustrative system (e.g., cloud-computing system 100) in which embodiments of the disclosure may be implemented, in accordance with at least one embodiment. Cloud-computing system 100 may include cloud-computing environment 102. In some embodiments, cloud-computing environment 102 may include any suitable number of infrastructure resources (e.g., hardware resources). By way of example, cloud-computing environment 102 include infrastructure resource 104, 106, and 108, although a different number of infrastructure resources may be utilized in a similar manner as described herein.

Infrastructure resource 104, 106, and 108 may individually be any suitable computing device such as a server computer, a desktop computer, a laptop computer, a tablet computer, or the like. As depicted in FIG. 1, the infrastructure resource 104, 106, and 108 depict individual server computers having a fixed amount of memory.

Figure 7:
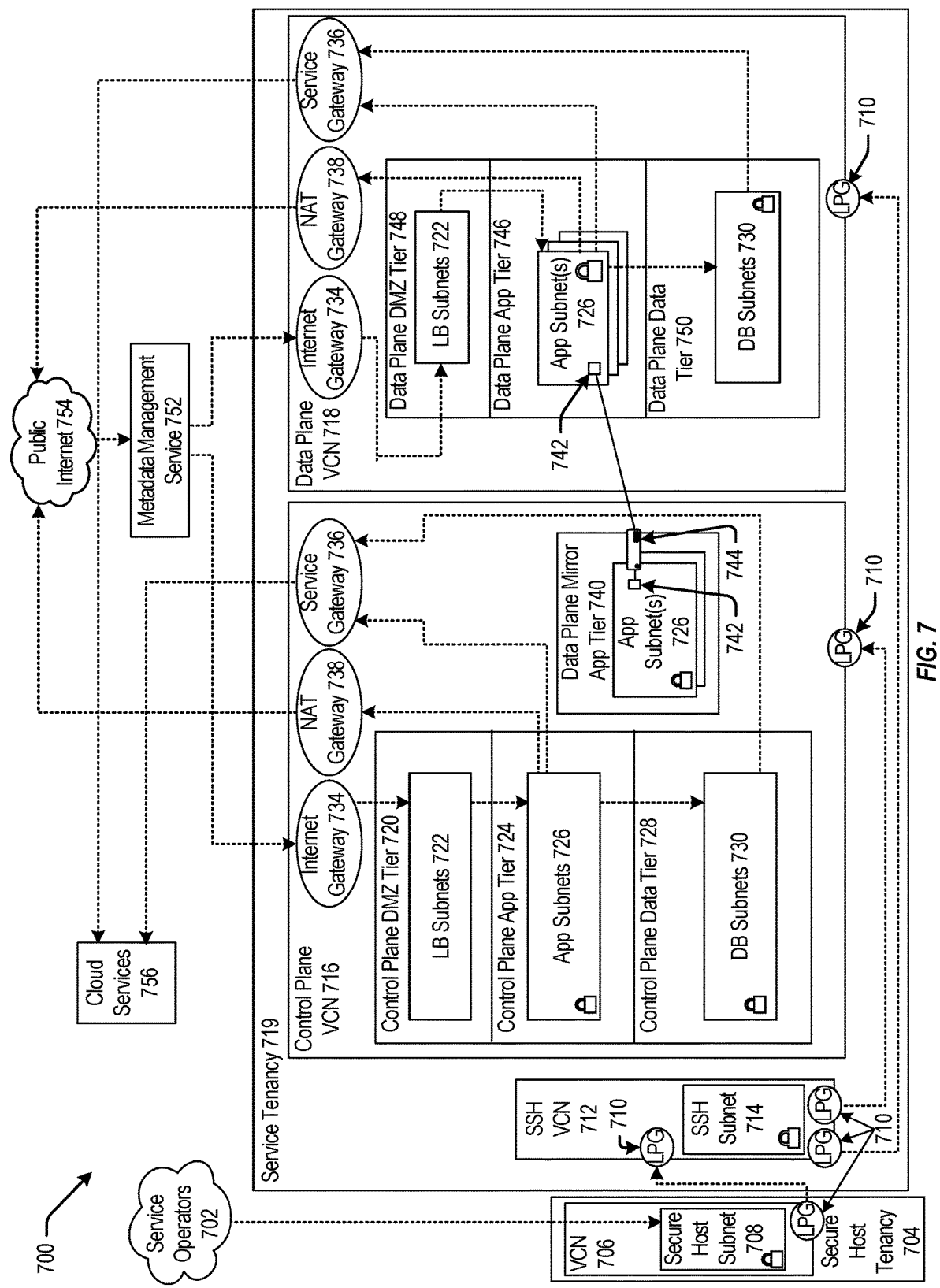
FIG. 7 is a block diagram illustrating one pattern for implementing a cloud infrastructure as a service system, according to at least one embodiment.

Cloud-computing environment 102 may include compute instance 110 (e.g., the compute instance 744 discussed in further detail with respect to FIG. 7). In some embodiments, compute instance 744 includes allocator 112, placement engine 114, and placement data 116. Allocator 112 may be configured to generate placement data 116 in response to a provisioning request received from the client device 118. Client device 118 may be any suitable computing device such as a server computer, a desktop computer, a laptop computer, a tablet computer, a smartphone, or the like. The placement data 116 may include a mapping of a particular virtual resource such as a particular virtual machine to a particular physical machine (e.g., an infrastructure resource of infrastructure resources 104-108). In some embodiments, the allocator 112 may be configured to execute any suitable number of bin-packing algorithms (e.g., a first-fit algorithm, a best-fit algorithm, a next-fit algorithm, etc.).

For example, in a next-fit (NF) algorithm, a first virtual machine is assigned to an infrastructure resource (IR). Virtual resources 2 to n (n being any suitable number) are then considered by increasing indices (2, followed by 3, followed by 4, etc.), each virtual machine being assigned to the current IR, if it fits, otherwise, the current VM is assigned to a new IR, which then becomes the current IR.

A first-fit (FF) algorithm considered the VMs according to increasing indices and assigns each one to the lowest indexed initialized IR into which it fits. Only when the current VM cannot fit into any initialized IR is a new IF introduced. As yet another example, a best-fit (BF) algorithm is obtained from FF by assigning the current VM to a feasible IR (if any) having the smallest residual capacity. The time complexity for FF and BF is $O(n \log n)$. It should be appreciated that any suitable bin-packing approximation algorithm may be utilized in the examples provided herein.

In some embodiments, a request may be received from the client device 118. The request need not include constraint data 120 (e.g., user-defined constraints). In response to receiving this request (e.g., a provisioning request), allocator 112 may be configured to generate placement data 116 according to predefined criteria using any suitable bin-packing approximation algorithm. In this use case, placement data 116 may identify three (or any suitable number of) virtual machines (e.g., virtual machines 122-126) are to be provisioned (placed) on infrastructure resource 104, 106, and 108 (as depicted at 128). Placement engine 114 may be any suitable software application and/or service that is configured to generate, instantiate, provision, and/or configure virtual machines 122-126 according to the placement data 116.

As another use case, a request may be received from the client device 118. The request may include constraint data 120 (e.g., user-defined constraints). The user-defined constraints may include any suitable number of constraints. In response to receiving this request (e.g., a provisioning request), allocator 112 may be configured to generate placement data 116 according using the constraint data as input with any suitable predetermined bin-packing algorithm. In some embodiments, the bin-packing algorithm utilized with constraint data 120 may be the same or a different bin-packing algorithm utilized when constraint data 120 is not present in the request. The bin-packing algorithm may utilize the constraint data to generate placement data 116. In this use case, placement data 116 may identify three (or any suitable number of) virtual machines (e.g., virtual machines 122-126) are to be provisioned (placed) on infrastructure resource 104 and 106 as depicted at 130. Placement engine 114 may generate, instantiate, provision, and/or configure virtual machines 122-126 according to the placement data 116 and as depicted in FIG. 1. In this manner, the user of client device 118 may affect the placement of the virtual machines 122-126 using constraint data 120.

As yet another use case, a request may be received from the client device 118. The request may include constraint data 120 (e.g., user-defined constraints). In some embodiments, the constraint data 120 includes placement data 116. The allocator 112 may be configured to identify that the request includes placement data, and if so, the allocator 112 may store the placement data 116 for subsequent use. As in the other use cases, placement engine 114 may generate, instantiate, provision, and/or configure virtual machines 122-126 according to the placement data 116.

It should be appreciated that the request/provisioning request may be communicated to the compute instance 110 via any suitable application programming interface (API). In some embodiments, the API may include an indicator that indicates the request includes constraint data 120. In other embodiments, the presence of constraint data 120 (e.g., via one or more data fields) may be indication itself that constraint data 120 is included in the request.

In some embodiments, when constraint data 120 is provided, if an error occurs with executing provisioning operations to provision the virtual machines 122-126 according to placement data 116, the user may be notified via any suitable electronic communication to client device 118. Similarly, the user may be notified if placement is successful. In some embodiments, the user may be notified that placement is possible (e.g., after the generation of placement data 116) and, if so, the user may consider such notification as a guarantee that his virtual machines will be placed according to the provided constraints.

The compute instance may operate as part of a control plane (not depicted) that is discussed in further detail below with respect to FIG. 7.

Figure 2:
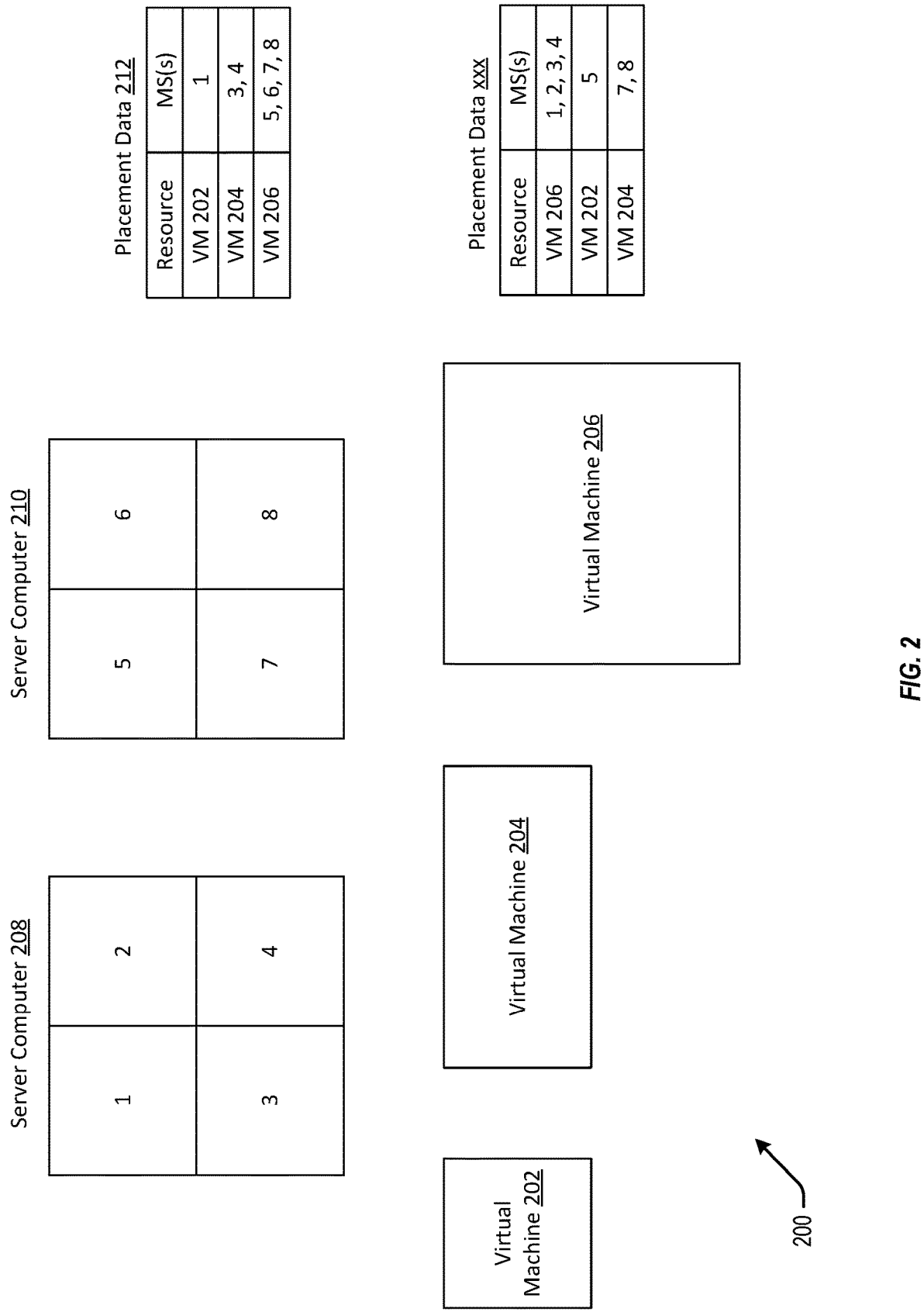
FIG. 2 depicts an example use case for provisioning a set of resources based at least in part on user-defined constraints, in accordance with at least one embodiment.

FIG. 2 depicts an example use case 200 for provisioning a set of virtual resources (e.g., virtual machines 202-206) according to user-defined constraints, in accordance with at least one embodiment. In some embodiments, a set number of hardware resources (e.g., server computer 208 and server computer 210) may be available. As a non-limiting example, server computer 208 and server computer 210 may have differing configuration and/or attributes. By way of example, server computer 208 may include a chipset A, random access memory of size B, and number of processing cores C. Server computer 210 may include a chipset D (e.g., the same or different from chipset A), random access memory of size E (the same as size B or a different size), and processing cores F (the same number as C or a different number).

As depicted, each server computer may include four memory spaces with server computer 208 having memory spaces 1-4 and server computer 210 having memory spaces 5-8. Each memory space may be equal size as the others, or the sizes may differ. For the purposes of illustration, each memory space of FIG. 2 is intended to be of equal size. Virtual machines 202-206 may require one or more memory spaces. By way of example, virtual machine 202 may require a single memory space, virtual machine 204 may require two memory spaces, and virtual machine 206 may require four memory spaces.

In one embodiment, an allocator (e.g., the allocator 112) may execute any suitable bin-packing algorithm using a set of predefined criteria in order to generate placement data 212. By way of example, the allocator 112 may utilize a first-fit algorithm to identify placements for the resources (e.g., VMs 202-206). First, the allocator may identify VM 202 as a first resource and memory space 1 as a first memory space. Since VM 202 fits in the memory allocation 1, the allocator may assign VM 202 to memory space 1 within the placement data 212. Next, the allocator may select VM 204 as a current resource and memory allocations 2 and 3 as a current memory space based on the size required for VM 204, The allocator may identify that virtual machine 204 may not be assigned to memory spaces 2 and 3 based at least in part on a predefined set of criteria. The allocator may then set the memory spaces 3 and 4 as the current memory space. Next, the allocator may determine that the VM 204 may fit in the memory spaces 3 and 4 (without failing the predefined set of criteria) and may assign VM 204 to the memory spaces 3 and 4 within placement data 212. The allocator may then select VM 206 as a current resource and memory spaces 5-8 as a current memory space based at least in part on the memory size required for VM 206 (e.g., since memory space 2 is not large enough for VM 206). The allocator may assign memory spaces 5-8 to VM 206 within placement data 212. This process may be repeated any suitable number of times for any suitable number of resources and/or memory spaces until all resources have been mapped to a memory space. Once generated, a placement engine (e.g., the placement engine 114 of FIG. 1) may provision the resources (e.g., VMs 202-206) according to the placement data 212.

As another example, a user may provide a set of user-defined constraints that state that a resource of a type matching VM 206 must be provisioned on a machine having chipset A. Thus, the allocator (e.g., the allocator 112 of FIG. 1) may execute a first-fit algorithm (or any suitable bin-packing algorithm) but attempt to first place resources for which the user-defined constraints apply. By way of example, the allocator may select VM 206 as a first resource based at least in part on the fact that the user-defined constraints require that VMs of VM 206's type are to be provisioned to machines having a particular attribute (e.g., chipset A). The allocator may then select memory spaces 1-4 as a first memory space for consideration based on the size requirement of the VM 206. As VM 206 can fit in memory spaces 1-4, and due to the fact that server computer 208 includes the required criteria (e.g., chipset A), the allocator may assign VM 206 to memory spaces 1-4 within placement data 214. The allocator may then select VM 202 as a current resource and memory space 5 as a current memory space since memory spaces 1-4 have been previously utilized (and because memory space 5 is the next indexed space). As VM 202 may fit in memory space 5, the allocator may assign VM 202 to memory space 5 within placement data 214. Next, the allocator may select VM 204 as a current resource and memory allocations 6 and 7 as a current memory space based on the size required for VM 204, The allocator may identify that virtual machine 204 cannot be assigned to memory spaces 6 and 7 based at least in part on a predefined set of criteria. The allocator may then set the memory spaces 7 and 8 as the current memory space. Next, the allocator may determine that the VM 204 may fit in the memory spaces 7 and 8 (without failing the predefined set of criteria) and may assign VM 204 to the memory spaces 7 and 8 within placement data 214. Once generated, a placement engine (e.g., the placement engine 114 of FIG. 1) may provision the resources (e.g., VMs 202-206) according to the placement data 214.

Figure 3:
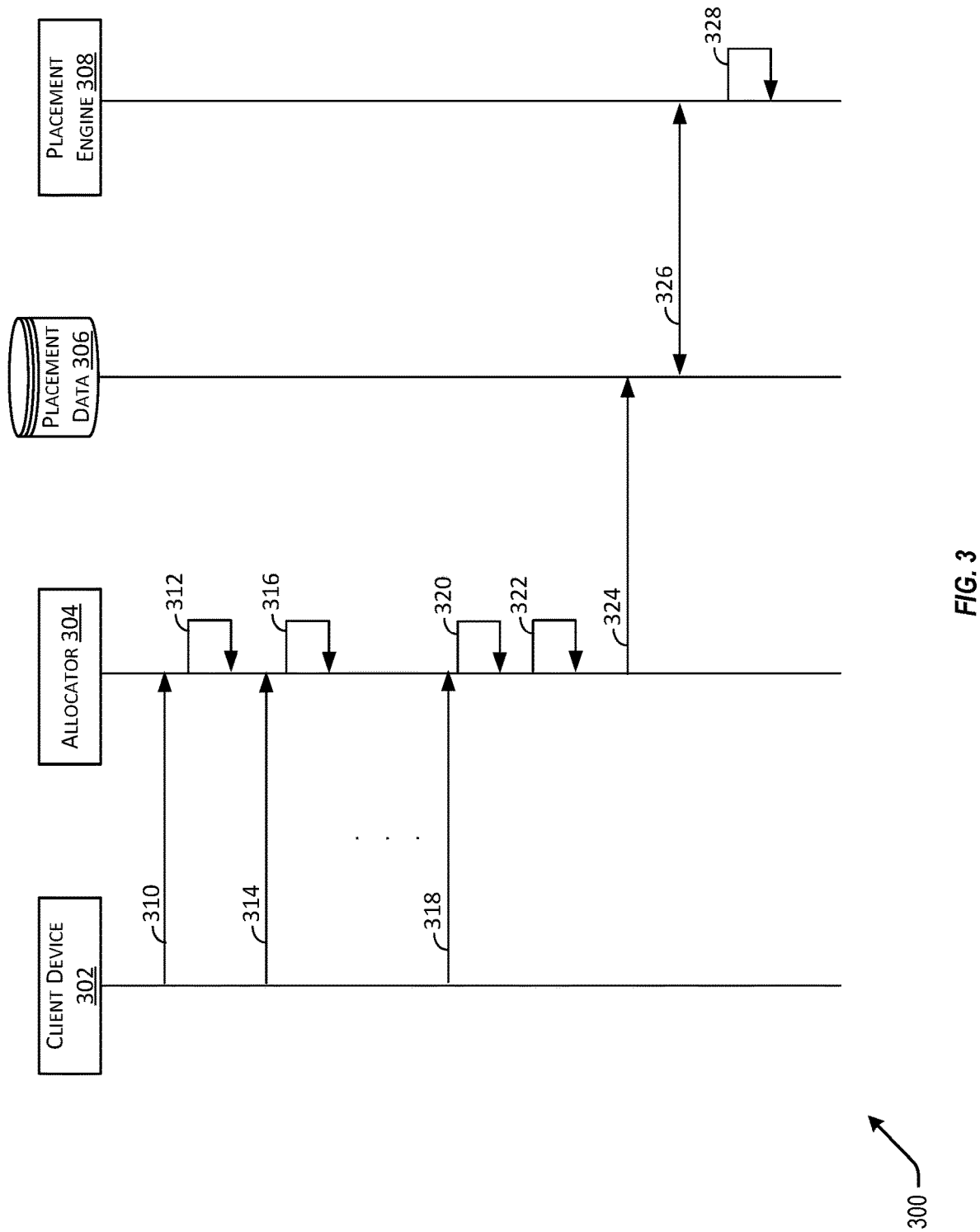
FIG. 3 depicts a process for provisioning a set of resources according to user-defined constraints, in accordance with at least one embodiment.

FIG. 3 depicts a process 300 for provisioning a set of resources according to user-defined constraints, in accordance with at least one embodiment. Client device 302 may be an example of the client device 118 of FIG. 1. Allocator 304 is intended to be an example of the allocator 112 of FIG. 1. Placement data 306 is intended to be an example of placement data 116 of FIG. 1. Placement engine 308 is intended to be an example of the placement engine 114 of FIG. 1.

The process 300 may begin at 310, where the client device 302 is utilized to transmit a first set of one or more user-defined constraints. By way of example, a user may utilize any suitable interface provided at client device 302 to input a user-defined constraint that requires no more than n virtual machines (e.g., 2 virtual machines, 1 virtual machine, 5 virtual machines, etc.) to be placed on a given infrastructure resource.

At 312, the allocator 304 may store the received user-defined constraint(s) for subsequent use. By way of example, the allocator may generate a record (e.g., an object within a storage container) and associate the record with the user and/or the client device 302. The set of user-defined constraints transmitted at 310 may be stored in this record.

At 314, the client device 302 may be utilized to transmit a second set of one or more user-defined constraints. By way of example, any suitable interface provided at client device 302 may be utilized to input a user-defined constraint that requires that resources of type A are to be placed in memory of an infrastructure resource having attribute B (e.g., at least a quad-core processor).

At 316, the allocator 304 may store the received user-defined constraint(s) for subsequent use. By way of example, the allocator may add the set of user-defined constraints transmitted at 310 to the record associated with client device 302 and generated at 312.

This process may be repeated any suitable number of times where a set of user-defined constraints are transmitted by the client device 302, received by the allocator 304, and stored in the record associated with client device 302. It is possible that the allocator 304 may be configured to handle any suitable number of client device requests from any suitable number of client devices and, thus, may store any suitable number of corresponding user-defined constraints in different records (e.g., records associated with each requesting client device) for subsequent use.

At 318, the client device 302 may be utilized to indicate that all of the user-defined constraints have been transmitted. In some embodiments, this may be in response to receiving, at an interface of the client device 302, user input indicating the user has provided all the user-defined constraints he intends to request.

At 320, the allocator 304 may receive the indication provided at 318 (e.g., indicating the set of user-defined constraints stored in the record associated with client device 302 is complete). In response to receiving this indication, the allocator may obtain a full set of user-defined constraints from the record associated with client device 302.

At 322, the allocator 304 may execute any suitable bin-packing algorithm with the user-defined constraints obtained from the record associated with the client device 302. By way of example, the allocator 304 may execute operations corresponding to the second example discussed in connection with FIG. 2 to generate placement data 306 for mapping a set of virtual resources (e.g., VMs) to particular infrastructure resources (e.g., server computers). In some embodiments, the placement data 306 may identify particular memory spaces of the infrastructure resource which may be utilized for the corresponding resource. It should be appreciated that, in some embodiments, the indication received at 318 need not be utilized to stimulate the operations executed at 320 and 322. Rather, in some embodiments, the allocator 304 may determination that a threshold period of time has elapsed since the receipt of the last set of user-defined constraints and may execute the operations of 320 and 322 in response to this determination.

At 324, the placement data 306 may be stored in any suitable storage location. By way of example, the placement data 306 may be stored in a storage container and associated with the client device 302. Alternatively, the placement data 306 may be provided directly to the placement engine 308 and the process 300 may proceed to 328.

At 326, the placement engine 308 may be configured to obtain placement data 306 from the storage container (not depicted). In some embodiments, the placement engine 308 may be called or otherwise stimulated by the allocator 304.

At 328, the placement engine 308 provisions virtual resources (e.g., VMs 202-206) to the infrastructure resources (e.g., server computers 208 and 210 of FIG. 2) in accordance with the placement data 306. In some embodiments, provisioning may include generating, instantiating, configuring, booting, or generally performing any suitable operations to make a particular virtual resource operational at a corresponding infrastructure resource, as defined in the placement data 306.

Figure 4:
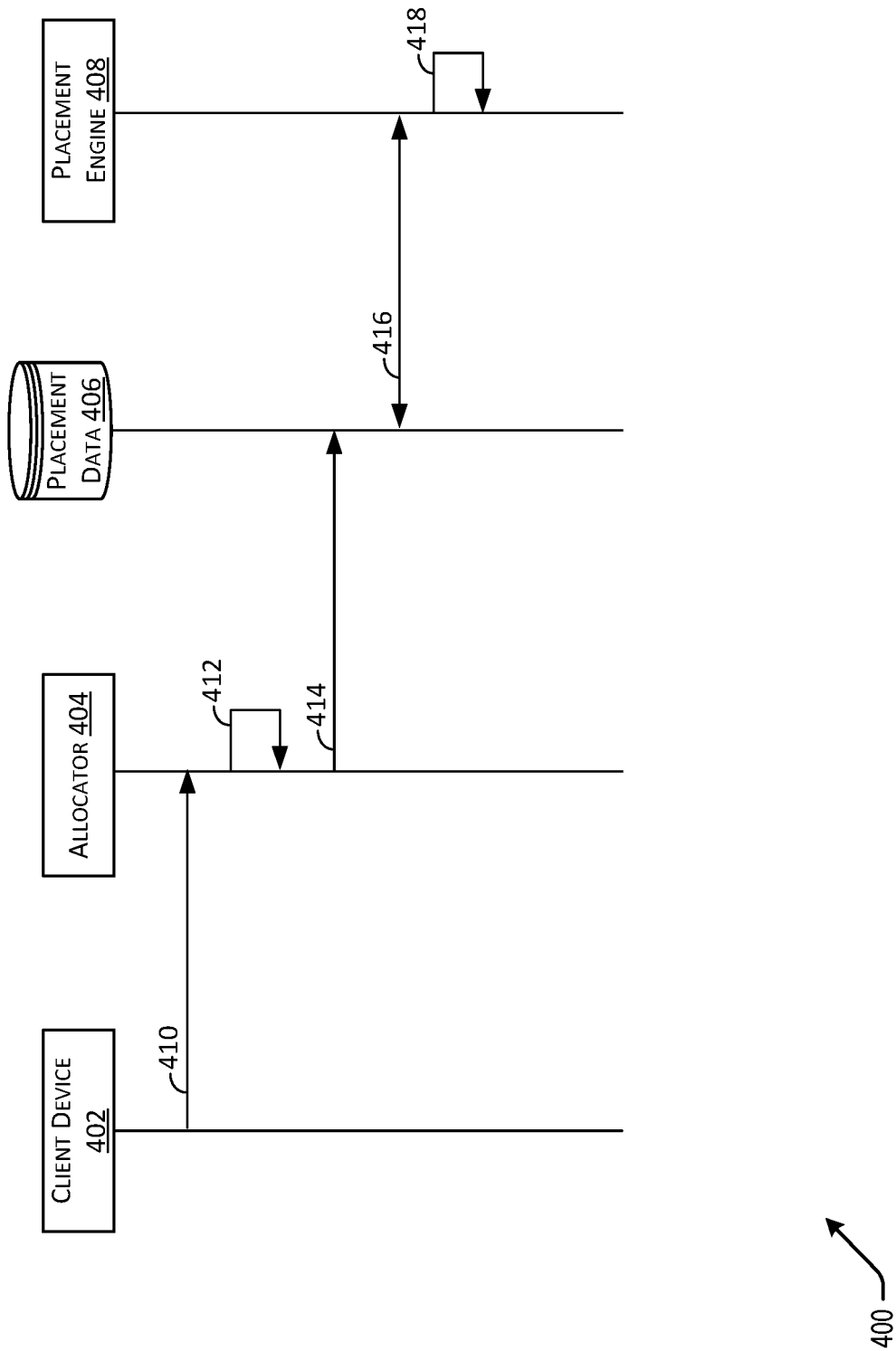
FIG. 4 depicts another process for provisioning a set of resources according to user-defined constraints, in accordance with at least one embodiment.

FIG. 4 depicts another process 400 for provisioning a set of resources according to user-defined constraints, in accordance with at least one embodiment. Client device 402 may be an example of the client device 118 of FIG. 1. Allocator 404 is intended to be an example of the allocator 112 of FIG. 1. Placement data 406 is intended to be an example of placement data 116 of FIG. 1. Placement engine 408 is intended to be an example of the placement engine 114 of FIG. 1.

The process 400 may begin at 410, where the client device 402 is utilized to transmit a complete set of one or more user-defined constraints. By way of example, a user may utilize any suitable interface provided at client device 402 to input one or more user-defined constraints. One constraint may require that no more than n virtual machines (e.g., 2 virtual machines, 1 virtual machine, 5 virtual machines, etc.) to be placed on a given infrastructure resource. Another constraint may require that resources of type A are to be placed in memory of an infrastructure resource having attribute B (e.g., at least a quad-core processor).

At 412, the allocator 404 may execute any suitable bin-packing algorithm with the user-defined constraints obtained from the record associated with the client device 402. By way of example, the allocator 404 may execute operations corresponding to the second example discussed in connection with FIG. 2 to generate placement data 406 for mapping a set of virtual resources (e.g., VMs) to particular infrastructure resources (e.g., server computers). In some embodiments, the placement data 406 may identify particular memory spaces of the infrastructure resource which may be utilized for the corresponding resource.

At 414, the placement data 406 may be stored in any suitable storage location. By way of example, the placement data 406 may be stored in a storage container and associated with the client device 402. Alternatively, the placement data 406 may be provided directly to the placement engine 408 and the process 400 may proceed to 418.

At 416, the placement engine 408 may be configured to obtain placement data 406 from the storage container (not depicted). In some embodiments, the placement engine 408 may be called or otherwise stimulated by the allocator 404.

At 418, the placement engine 408 provisions virtual resources (e.g., VMs 202-206) to the infrastructure resources (e.g., server computers 208 and 210 of FIG. 2) in accordance with the placement data 406. As described above, provisioning may include generating, instantiating, configuring, booting, or generally performing any suitable operations to make a particular virtual resource operational at a corresponding infrastructure resource, in this case, as defined in placement data 406.

Figure 5:
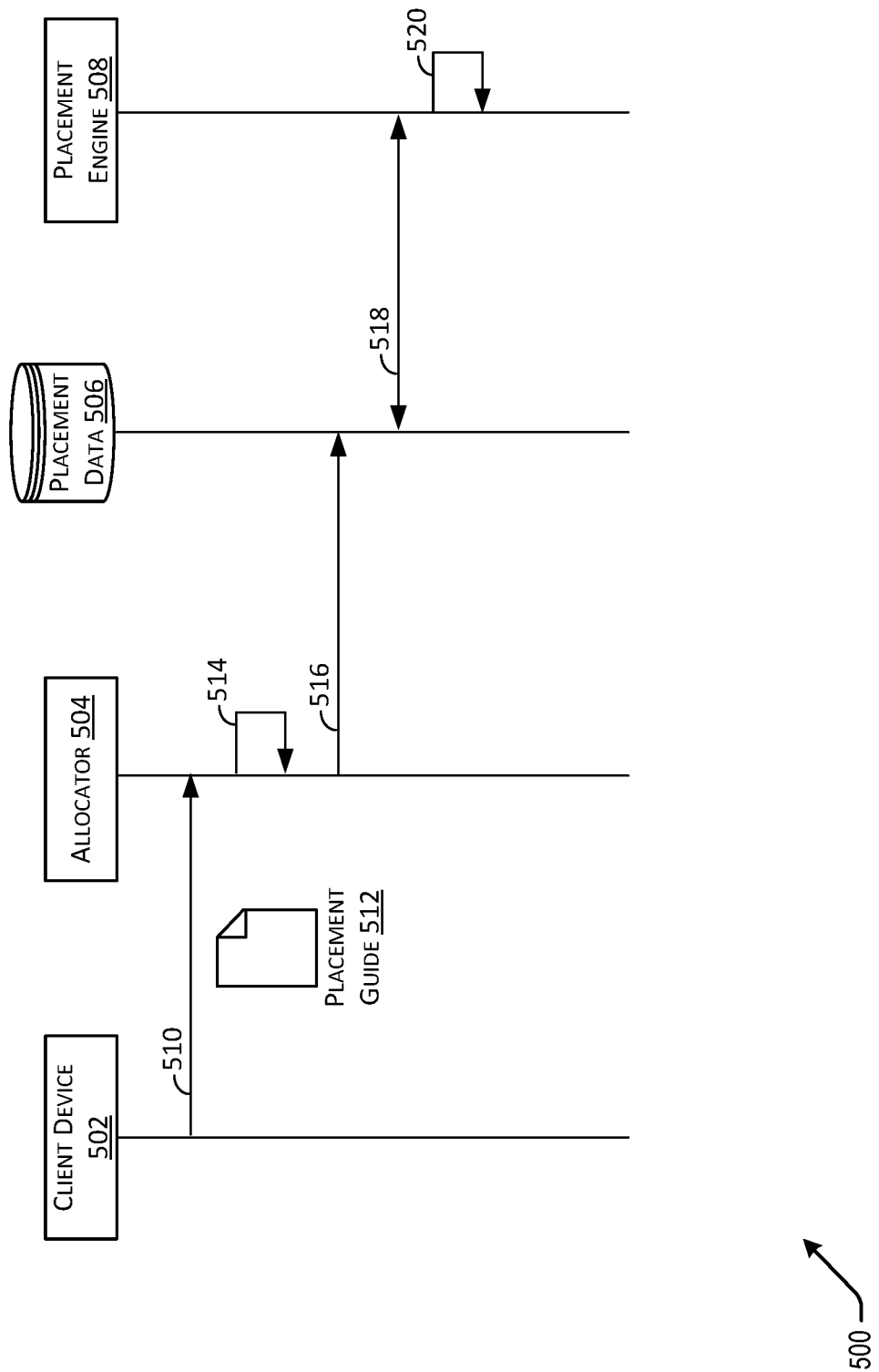
FIG. 5 depicts yet another process for provisioning a set of resources according to user-defined constraints, in accordance with at least one embodiment.

FIG. 5 depicts yet another process 500 for provisioning a set of resources according to user-defined constraints, in accordance with at least one embodiment. Client device 502 may be an example of the client device 118 of FIG. 1. Allocator 504 is intended to be an example of the allocator 112 of FIG. 1. Placement data 506 is intended to be an example of placement data 116 of FIG. 1. Placement engine 508 is intended to be an example of the placement engine 114 of FIG. 1.

The process 500 may begin at 510, where the client device 502 is utilized to transmit a placement guide 512 within a provisioning request. The placement guide 512 may be an instance of placement data 506 that is user-defined. By way of example, client device 502 (or another suitable computing resource available to the user) may be utilized to perform bin-packing algorithm with one or more predefined constraints and/or with one or more user-defined constraints. The output of the bin-packing algorithm may be placement guide 512 which may map a set of one or more virtual resources (e.g., VMs) to corresponding infrastructure components of a cloud-computing environment (e.g., cloud-computing environment 100 of FIG. 1). In some embodiments, the client device 502 may have previously obtained information describing the attributes (e.g., processor(s), memory size, memory, type, number of cores, etc.) of each infrastructure resource available within the cloud-computing environment. This information may be utilized with the bin-packing algorithm executed by the client device 502 to generate the placement guide 512.

At 514, the allocator 504 may identify the existence of placement guide 512 within the request transmitted at 510.

At 516, in response to identifying the existence of placement guide 512, the allocator 504 may store placement guide 512 as placement data 506. Placement data 506 may be stored in any suitable storage location. By way of example, the placement data 506 may be stored in a storage container and associated with the client device 502. Alternatively, the placement data 506 may be provided directly to the placement engine 508.

At 518, the placement engine 508 may be configured to obtain placement data 506 from the storage container (not depicted). In some embodiments, the placement engine 508 may be called or otherwise stimulated by the allocator 504.

At 520, the placement engine 408 may be configured to provision virtual resources (e.g., VMs 202-206) to the infrastructure resources (e.g., server computers 208 and 210 of FIG. 2) in accordance with the placement data 406. As described above, provisioning may include generating, instantiating, configuring, booting, or generally performing any suitable operations to make a particular virtual resource operational at a corresponding infrastructure resource, in this case, as defined in placement data 406.

It should be appreciated that any of processes 300-500 may be executed in response to identifying (e.g., by the corresponding allocator of FIGS. 3-5) that a request includes one or more user-defined constraints (e.g., a constraint defined by a user, a placement guide, etc.). In some embodiments, if a user-constraint is not included in a request, the allocator of FIGS. 3-5 may perform a default bin-packing process which may utilize any suitable bin-packing algorithm and a predefined set of criteria that are not received from a client device 302 but instead hard coded and/or set by an administrator prior to request receipts (e.g., as part of preprocessing operations).

It should be appreciated that any of processes 300-500 may generate any suitable number of placement data. That is, the system may compute multiple solutions. In some embodiments, the multiple instances of placement data may be scored according to any suitable metric (e.g., cost of equipment, memory usage, performance metrics, and the like) and a particular instance of placement data may be selected based at least in part on the score.

In some embodiments, providing the user-defined constraints incrementally as described in FIG. 3 may cause the bin-packing algorithm to execute faster than if all of the user-defined constraints were provided at once as described in connection with FIG. 4.

Figure 6:
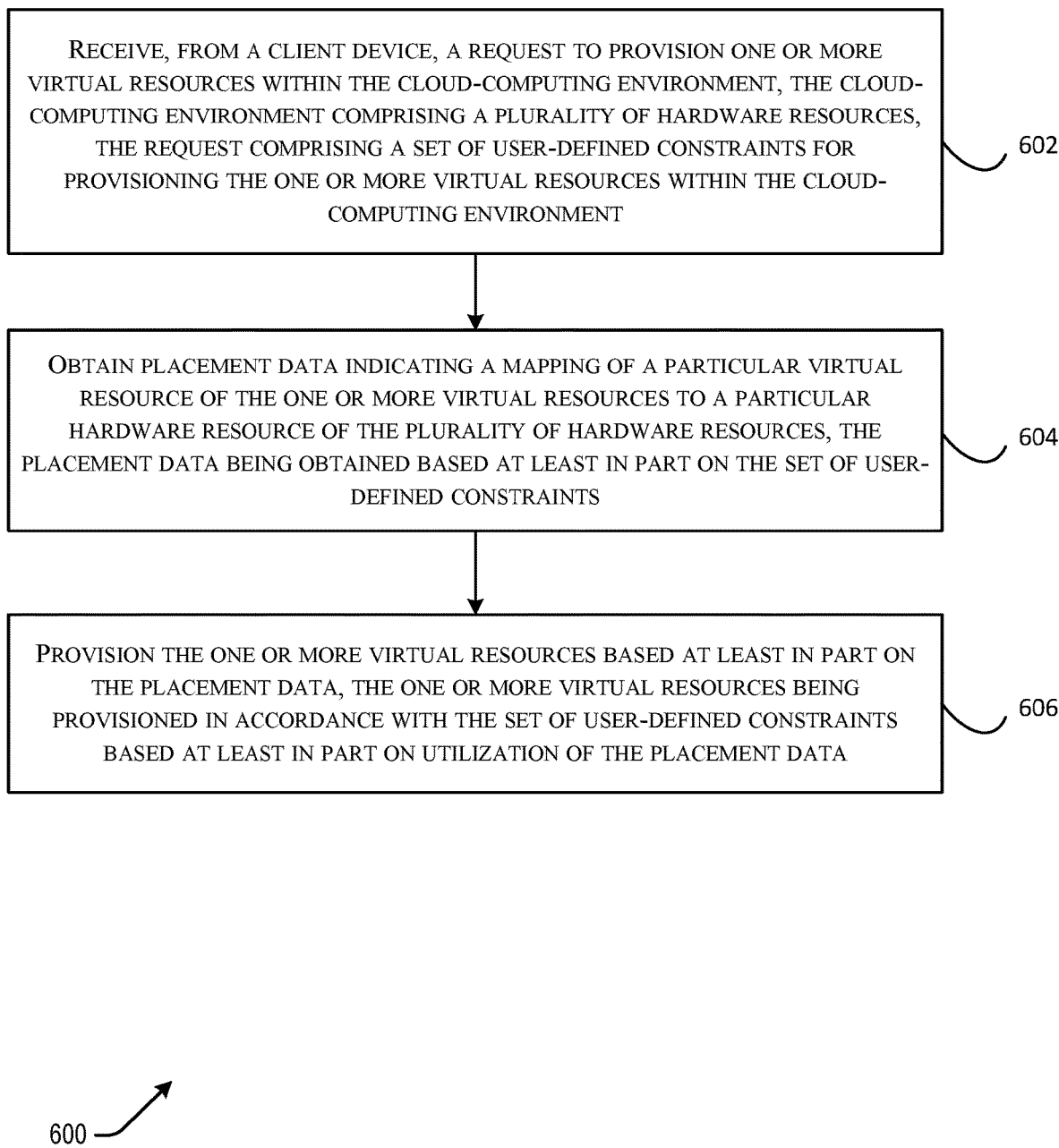
FIG. 6 depicts a flowchart illustrating an example of a method for provisioning one or more virtual resources within a cloud-computing environment, in accordance with at least one embodiment.

FIG. 6 depicts a flowchart illustrating an example of a method 600 for provisioning one or more virtual resources within a cloud-computing environment, in accordance with at least one embodiment.. A computer-readable medium may store computer-executable instructions that, when executed by at least one processor, cause at least one computer to perform instructions comprising the operations of the method 600. It should be appreciated that the operations of the method 600 may be performed in any suitable, not necessarily the order depicted in FIG. 6. Further, the method 600 may include additional, or fewer operations than those depicted in FIG. 6. The operations of method 600 may be performed by a computing system (e.g., the cloud computing system 100 of FIG. 1) comprising a compute instance (e.g., compute instance 110 of FIG. 1) which may include the allocator 112 and placement engine 114 of FIG. 1. In some embodiments, the method 600 may be performed by the compute instance 110.

The method 600 may begin at block 602, where a request to provision one or more virtual resources within the cloud-computing environment may be received (e.g., by a computing service of a cloud-computing environment). By way of example, the request may be received by the compute instance 110 of FIG. 1 (or more specifically, the allocator 112 of FIG. 1). In some embodiments, the cloud-computing environment (e.g., cloud-computing environment 100) may comprise a plurality of hardware resources (e.g., infrastructure resources 104-108 of FIG. 1, server computers 208 and/or 210, etc.). In some embodiments, the request comprises a set of user-defined constraints for provisioning the one or more virtual resources within the cloud-computing environment. The request may be one in a series of requests as described in connection with FIG. 3 or the request may a single request as described in connection with FIGS. 4 and 5.

At 604, placement data indicating a mapping of a particular virtual resource of the one or more virtual resources to a particular hardware resource of the plurality of hardware resources may be obtained. In some embodiments, the placement data is obtained based at least in part on the set of user-defined constraints. By way of example, the placement data may be obtained by executing any suitable bin-packing algorithm using the set of user-defined constraints as input.

At 606, the one or more virtual resources may be provisioned (e.g., by the placement engine 114 of FIG. 1) based at least in part on the placement data obtained at 604. In some embodiments, the one or more virtual resources are provisioned in accordance with the set of user-defined constraints based at least in part on utilization of the placement data.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep security breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plan VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of security, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
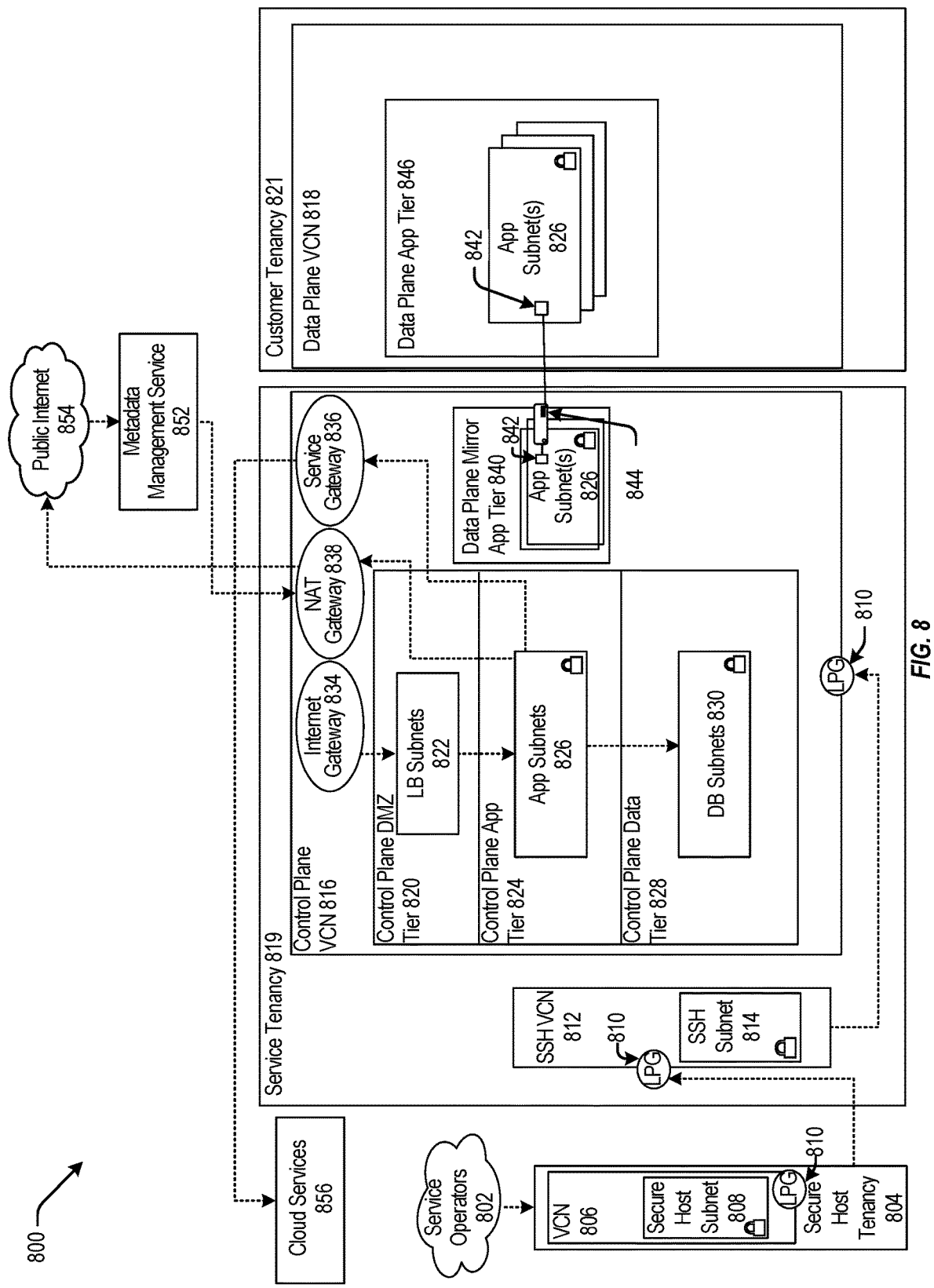
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plan app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
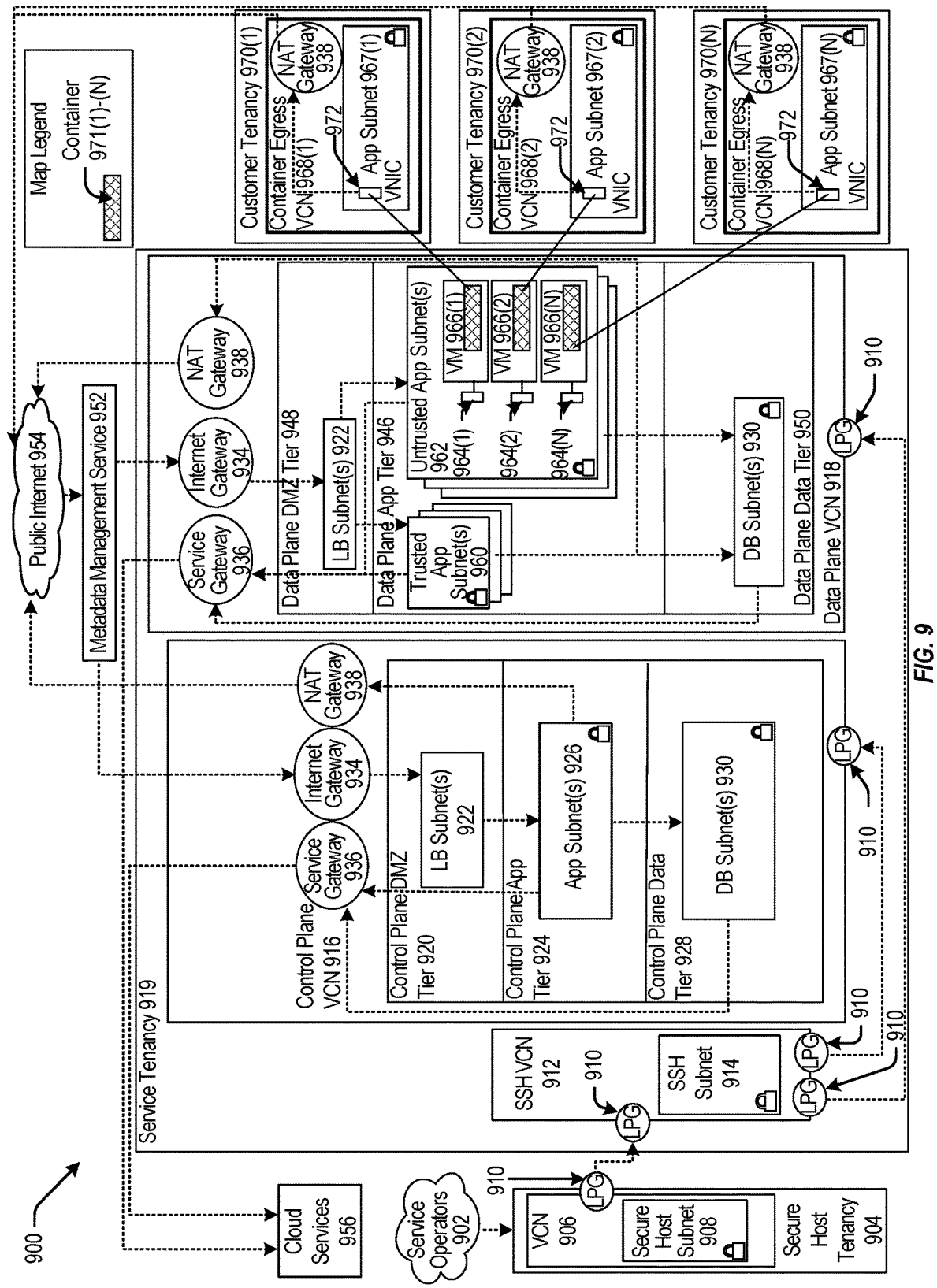
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
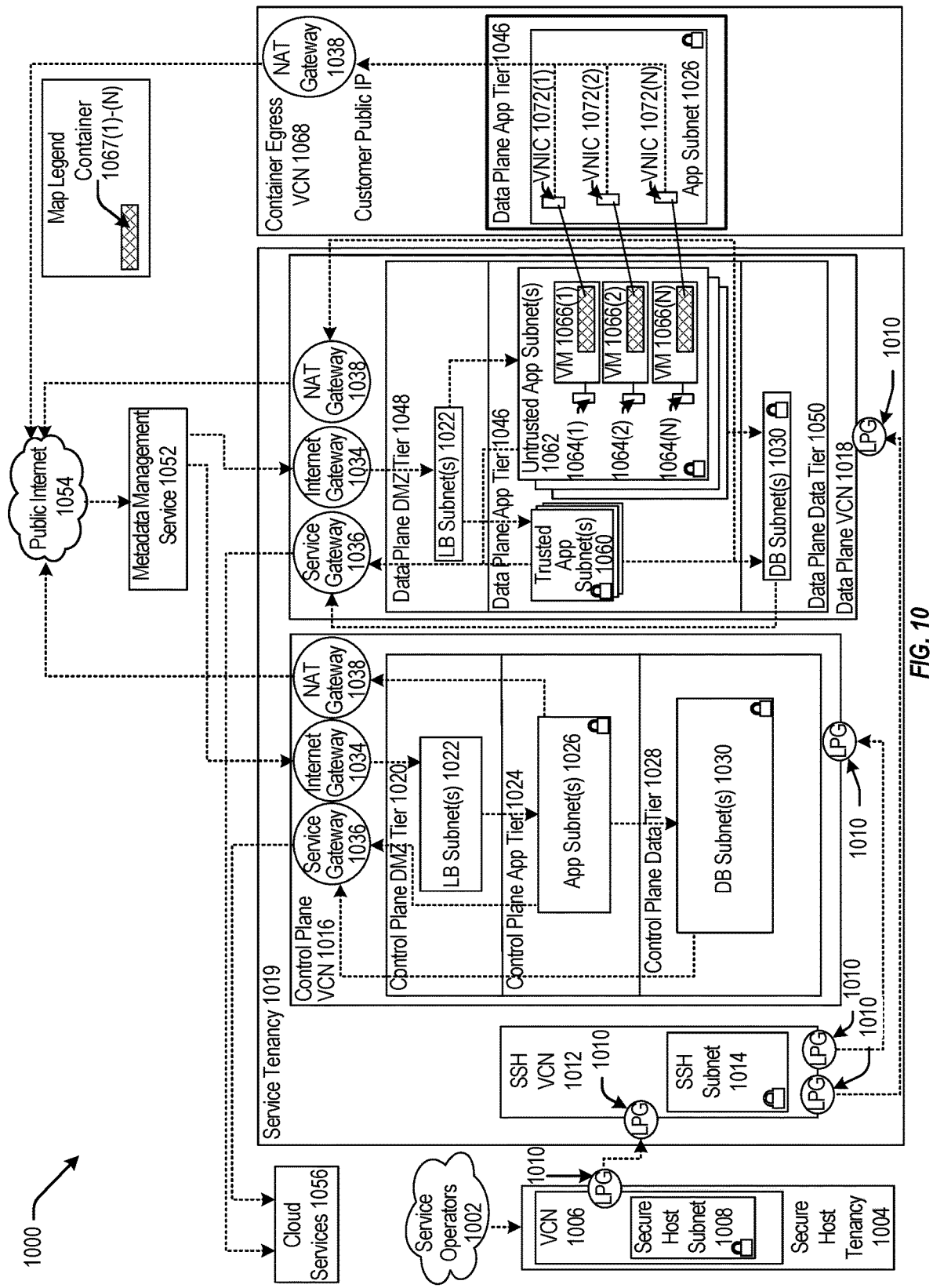
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
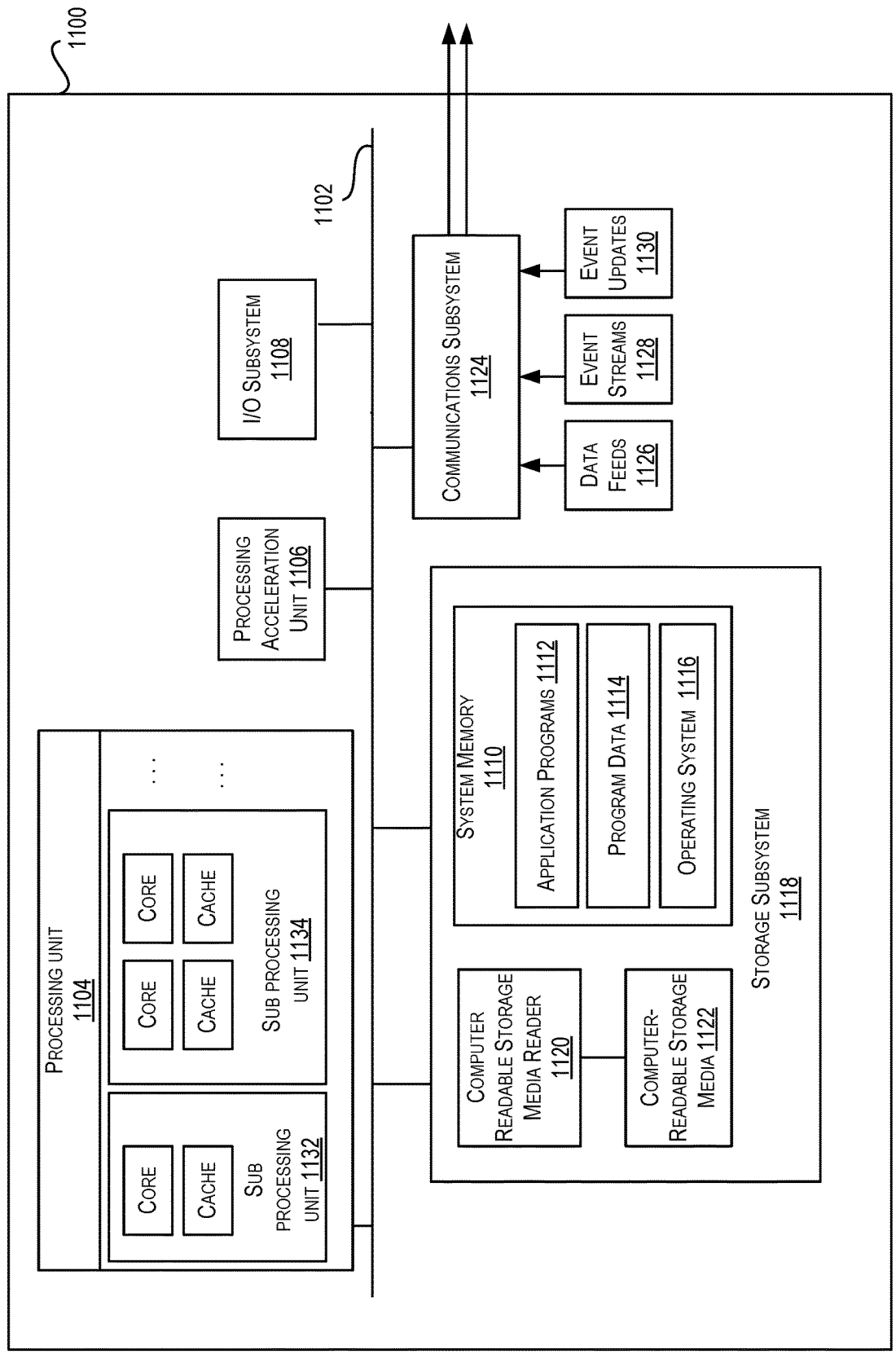
FIG. 11 is a block diagram illustrating an example computer system, according to at least one embodiment.

FIG. 11 illustrates an example computer system 1100, in which various embodiments of the present disclosure may be implemented. The system 1100 may be used to implement any of the computer systems/computing devices described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118.

These software modules or instructions may be executed by processing unit 1104. Storage subsystem 1118 may also provide a repository for storing data used in accordance with the present disclosure.

Storage subsystem 1118 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, by a computing service of a cloud-computing environment from a client device, a request to provision a virtual resource within the cloud-computing environment, the request comprising a set of user-defined constraints for provisioning the virtual resource within the cloud-computing environment;
   in accordance with identifying that the set of user-defined constraints lacks user-generated placement data:
      generating, using the set of user-defined constraints and a bin-packing algorithm, a mapping between the virtual resource and a first hardware resource of the cloud-computing environment; and
      provisioning, by the computing service, the virtual resource based at least in part on the mapping, the virtual resource being provisioned in accordance with the set of user-defined constraints based at least in part on utilization of the mapping; and
   in accordance with identifying that the set of user-defined constraints includes the user-generated placement data, provisioning, by the computing service, the virtual resource to a second hardware resource in accordance with the user-generated placement data.

2. The computer-implemented method of claim 1, wherein the request to provision the virtual resource is one of a plurality of messages provided incrementally, each of the plurality of messages comprising a corresponding set of user-defined constraints for provisioning a particular virtual resource of a plurality of virtual resources within the cloud-computing environment.

3. The computer-implemented method of claim 2, further comprising receiving an indication that all user-defined constraints for provisioning the plurality of virtual resources has been received, wherein the mapping is generated further based at least in part on receiving the indication.

4. The computer-implemented method of claim 1, wherein the set of user-defined constraints are received in a single message.

5. The computer-implemented method of claim 1, wherein the request comprises a plurality of messages, and wherein the set of user-defined constraints for provisioning the virtual resource within the cloud-computing environment are received via the plurality of messages.

6. The computer-implemented method of claim 1, further comprising:
   identifying, by the computing service, that the request comprises the set of user-defined constraints; and
   in response to identifying that the request comprises the set of user-defined constraints, overriding a default process for provisioning resources of the cloud-computing environment to provision the virtual resource based at least in part on the mapping generated from the set of user-defined constraints, wherein the default process for provisioning resources provisions resources based at least in part on one or more default constraints that are different from user-defined constraints.

7. The computer-implemented method of claim 1, wherein the set of user-defined constraints includes at least two of: a number of computing cores, an amount of memory, an amount of storage space, a chipset type, a cost, or a resource density.

8. A cloud-computing service, comprising:
   a computer-readable medium storing non-transitory computer-executable program instructions; and
   a processing device communicatively coupled to the computer-readable medium for executing the non-transitory computer-executable program instructions, wherein executing the non-transitory computer-executable program instructions with the processing device causes the cloud-computing service to perform operations comprising:

receiving, from a client device, a request to provision a virtual resource within a cloud-computing environment, the request comprising a set of user-defined constraints for provisioning the virtual resource within the cloud-computing environment;

in accordance with identifying that the set of user-defined constraints lacks user-generated placement data:

generating, using the set of user-defined constraints and a bin-packing algorithm, a mapping between the virtual resource and a first hardware resource of the cloud-computing environment; and provisioning the virtual resource based at least in part on the mapping, the virtual resource being provisioned in accordance with the set of user-defined constraints based at least in part on utilization of the mapping; and in accordance with identifying that the set of user-defined constraints includes the user-generated placement data, provisioning the virtual resource to a second hardware resource in accordance with the user-generated placement data.

9. The cloud-computing service of claim 8, wherein the request to provision the virtual resource is one of a plurality of messages provided incrementally, each of the plurality of messages comprising a corresponding set of user-defined constraints for provisioning a particular virtual resource of a plurality of virtual resources within the cloud-computing environment.

10. The cloud-computing service of claim 9, wherein executing the computer-executable program instructions by the processing device causes the cloud-computing service to perform additional operations comprising receiving an indication that all user-defined constraints for provisioning the plurality of virtual resources has been received, wherein the mapping is generated further based at least in part on receiving the indication.

11. The cloud-computing service of claim 8, wherein the set of user-defined constraints are received in a single message.

12. The cloud-computing service of claim 8, wherein the request comprises a plurality of messages, and wherein the set of user-defined constraints for provisioning the virtual resource within the cloud-computing environment are received via the plurality of messages.

13. The cloud-computing service of claim 8, wherein executing the computer-executable program instructions by the processing device causes the cloud-computing service to perform additional operations comprising:

identifying that the request comprises the set of user-defined constraints; and in response to identifying that the request comprises the set of user-defined constraints, overriding a default process for provisioning resources of the cloud-computing environment to provision the virtual resource based at least in part on the mapping generated from the set of user-defined constraints, wherein the default process for provisioning resources provisions resources based at least in part on one or more default constraints that are different from user-defined constraints.

14. The cloud-computing service of claim 8, wherein the set of user-defined constraints includes at least two of: a number of computing cores, an amount of memory, an amount of storage space, a chipset type, a cost, or a resource density.

15. A non-transitory computer-readable medium storing computer-executable program instructions that, when executed by a processing device of a computing device, cause the computing device to perform operations comprising:

receiving, from a client device, a request to provision a virtual resource within a cloud-computing environment, the request comprising a set of user-defined constraints for provisioning the virtual resource within the cloud-computing environment;

in accordance with identifying that the set of user-defined constraints lacks user-generated placement data:

generating, using the set of user-defined constraints and a bin-packing algorithm, a mapping between the virtual resource and a first hardware resource of the cloud-computing environment; and provisioning the virtual resource based at least in part on the mapping, the virtual resource being provisioned in accordance with the set of user-defined constraints based at least in part on utilization of the mapping; and in accordance with identifying that the set of user-defined constraints includes the user-generated placement data, provisioning the virtual resource to a second hardware resource in accordance with the user-generated placement data.

16. The non-transitory computer-readable medium of claim 15, wherein the request to provision the virtual resource is one of a plurality of messages provided incrementally, each of the plurality of messages comprising a corresponding set of user-defined constraints for provisioning a particular virtual resource of a plurality of virtual resources within the cloud-computing environment.

17. The non-transitory computer-readable medium of claim 16, wherein executing the computer-executable program instructions by the processing device causes the computing device to perform additional operations comprising receiving an indication that all user-defined constraints for provisioning the plurality of virtual resources has been received, wherein the mapping is generated further based at least in part on receiving the indication.

18. The non-transitory computer-readable medium of claim 15, wherein the set of user-defined constraints are received in a single message.

19. The non-transitory computer-readable medium of claim 15, wherein the request comprises a plurality of messages, and wherein the set of user-defined constraints for provisioning the virtual resource within the cloud-computing environment are received via the plurality of messages.

20. The non-transitory computer-readable medium of claim 15, wherein executing the computer-executable program instructions by the processing device causes the computing device to perform additional operations comprising:

identifying that the request comprises the set of user-defined constraints; and in response to identifying that the request comprises the set of user-defined constraints, overriding a default process for provisioning resources of the cloud-computing environment to provision the virtual resource based at least in part on the mapping generated from the set of user-defined constraints, wherein the default process for provisioning resources provisions resources based at least in part on one or more default constraints that are different from user-defined constraints.

\* \* \* \* \*